(12) United States Patent
James Shirley et al.

(10) Patent No.: US 11,366,060 B2
(45) Date of Patent: Jun. 21, 2022

(54) APPARATUS FOR DETECTING FLUORESCENT LIGHT EMITTED FROM A SAMPLE, A BIOSENSOR SYSTEM, AND A DETECTOR FOR DETECTING SUPERCRITICAL ANGLE FLUORESCENT LIGHT

(71) Applicants: IMEC VZW, Leuven (BE); Katholieke Universiteit Leuven, Leuven (BE)

(72) Inventors: Finub James Shirley, Leuven (BE); Pol Van Dorpe, Spalbeek (BE)

(73) Assignees: IMEC VZW, Leuven (BE); KATHOLIEKE UNIVERSITEIT LEUVEN, Leuven (BE)

( * ) Notice: Subject to any disclaimer, the term of this patent is extended or adjusted under 35 U.S.C. 154(b) by 0 days.

(21) Appl. No.: 16/647,011

(22) PCT Filed: Sep. 18, 2018

(86) PCT No.: PCT/EP2018/075193
§ 371 (c)(1),
(2) Date: Mar. 12, 2020

(87) PCT Pub. No.: WO2019/057707
PCT Pub. Date: Mar. 28, 2019

(65) Prior Publication Data
US 2020/0271582 A1   Aug. 27, 2020

(30) Foreign Application Priority Data
Sep. 20, 2017   (EP) ..................... 17192083

(51) Int. Cl.
*G01N 21/64* (2006.01)
(52) U.S. Cl.
CPC ....... *G01N 21/6428* (2013.01); *G01N 21/648* (2013.01); *G01N 21/6454* (2013.01);
(Continued)

(58) Field of Classification Search
CPC .... G01N 21/64; G01N 21/645; G01N 21/648; G01N 21/6458; G01N 21/66;
(Continued)

(56) References Cited

U.S. PATENT DOCUMENTS 6,714,297 B1 *  3/2004  Ruckstuhl ............ G01N 21/552
                                                      250/458.1
8,958,156 B1    2/2015  Erdogan et al.
(Continued)

FOREIGN PATENT DOCUMENTS

EP        3159677 A1    4/2017

OTHER PUBLICATIONS

Stefinita et al., "A Proposal for Optical Diagnostics Through the Enhancement of Diffraction Using Thin-film Interference Filters", Biotechnology and Bioprocess Engineering, vol. 9, XP55455884, pp. 428-434, Nov. 1, 2004.
(Continued)

*Primary Examiner* — Hoa Q Pham
(74) *Attorney, Agent, or Firm* — Moser Taboada

(57) ABSTRACT

An apparatus for detecting fluorescent light emitted from a sample comprises: a light source, which is configured to emit excitation light of an excitation wavelength towards a sample comprising fluorophores such that fluorescent light is induced; a photo-detector for detecting light incident on the photo-detector; and an interference filter arranged on the photo-detector, wherein the interference filter is configured to selectively collect and transmit light towards the photo-detector based on an angle of incidence of the light towards the interference filter, wherein the interference filter is configured to selectively transmit supercritical angle fluorescence from the sample towards the photo-detector and suppress undercritical angle fluorescence from the sample.

13 Claims, 4 Drawing Sheets

(52) U.S. Cl.
CPC . *G01N 21/6456* (2013.01); *G01N 2021/6421* (2013.01); *G01N 2021/6471* (2013.01)

(58) Field of Classification Search
CPC .... G01N 21/76; G01N 21/6452; G01N 21/43; G01N 21/6486; G01N 33/54373; G01N 2021/6471; G02B 21/367; G02B 21/0088; G02B 5/005; G02B 21/16; G02B 21/33; G02B 21/361
USPC ........ 356/543–440, 445, 128–135, 300–326, 356/432–440; 422/82.08, 82.07; 250/216, 458.1, 459.1
See application file for complete search history.

(56) References Cited

U.S. PATENT DOCUMENTS

| | | | |
|---|---|---|---|
| 2002/0190211 A1 | 12/2002 | Watanabe | |
| 2007/0231883 A1* | 10/2007 | Lindstrom | G01N 21/645 435/287.2 |
| 2010/0243914 A1 | 9/2010 | Kurzbuch et al. | |
| 2012/0295805 A1* | 11/2012 | Levicky | C12Q 1/6825 506/9 |
| 2013/0236982 A1 | 9/2013 | Bakker et al. | |
| 2015/0090900 A1 | 4/2015 | Banks et al. | |
| 2015/0253478 A1* | 9/2015 | Aube | G02C 7/107 359/589 |
| 2016/0011112 A1 | 1/2016 | Tappura et al. | |
| 2016/0343766 A1* | 11/2016 | Kokubun | H01L 27/14627 |
| 2017/0138859 A1 | 5/2017 | Fujiyo et al. | |

OTHER PUBLICATIONS

O'Driscoll et al., "Enhanced Fluorescence-Based Optical Sensor Performance Using a Simple Optical Collection Strategy", IEEE Photonics Technology Letters, IEEE Service Center, Piscataway,NJ, US, vol. 24, No. 6, XP011423004, pp. 425-427, Mar. 15, 2012.
Kurzbuch et al., "High efficiency ring-lens supercritical angle fluorescence (SAF) detection for optimum bioassay performance", Biomedical Diagnostics Institute, School of Physical Sciences, Dublin City University, Glasnevin, Dublin 9, Ireland *dirk. kurzbuch@dcu.ie, vol. 21, No. 19, Mar. 23, 2013.
International Search Report on Application No. PCT/EP2018/075193 dated Oct. 24, 2018.
Valimaki et al: "A novel platform for highly surface-sensitive fluorescent measurements applying simultaneous total internal reflection excitation and super critical angle detection", Chemical Physics Letters, vol. 473, No. 4-6, pp. 358-362, May 2009.

* cited by examiner

APPARATUS FOR DETECTING FLUORESCENT LIGHT EMITTED FROM A SAMPLE, A BIOSENSOR SYSTEM, AND A DETECTOR FOR DETECTING SUPERCRITICAL ANGLE FLUORESCENT LIGHT

TECHNICAL FIELD

The present inventive concept relates to an apparatus for detecting fluorescent light emitted from a sample. In particular, the present inventive concept relates to detecting supercritical angle fluorescent light. The present inventive concept also relates to a biosensor system making use of detection of supercritical angle fluorescent light from a sample.

BACKGROUND

Fluorescence is commonly used for studying samples in cell and molecular biology. The sample may be prepared by providing a fluorescent substance (fluorophore), that may be selectively bound to a part of the sample that is to be analyzed. Alternatively, an intrinsic fluorescence of the sample may be used in exciting fluorescent light from the sample.

In diagnostic assays, target molecules and fluorophores are immobilized on a bottom surface of sample holder. A bulk solution may thus comprise a large amount of fluorophores that may make it impossible to distinguish fluorescence from the target molecules from the bulk solution fluorescence. Thus, it may be necessary to wait a long time for the fluorophores in the bulk solution to settle to the surface before an analysis may be made. An alternative is to selectively analyze surface bound fluorophores. Thus, surface sensitive techniques are of special interest.

It is presently known to use techniques for selectively exciting the fluorophores that are surface bound. For instance, using total internal reflection microscopy (TIRF), evanescent excitation may be used for exciting only a thin portion of a sample at the surface of the sample holder. The evanescent excitation is based on a small portion of light escaping a surface in which total internal reflection occurs and intensity of the light will very quickly decrease with distance from the surface. Thus, target molecules may be selectively excited in order to avoid fluorescent light of interest to be drowned by fluorescence from the bulk solution.

The light emission of fluorophores can be described by an electrical dipole, which preferentially emits light in certain axes depending on orientation of the fluorophore. In addition to such propagation component of emitted light, fluorophores also have an evanescent non-propagating component. A part of this non-propagating component becomes propagating when the fluorophore is at or below a distance of one wavelength from a surface interface between two materials, specifically when the other material has a larger refractive index than the material that encloses the fluorophore. This is called supercritical angle fluorescence (SAF) and is emitted above the critical angle of the interface between the two materials.

Thus, SAF phenomenon has been used together with TIRF in order to further improve resolution in imaging of portions of a sample close to a surface.

US 2016/0011112 A1 discloses a sample plate and an analyzing method, wherein the sample plate comprises a substrate, at least one sensor site on a first surface of the substrate and at least one optical element on a second surface of the substrate. The sample plate is further provided with a waveguide on the second surface for guiding an excitation signal to interact with the at least one sensor site. The method comprises bringing the sample in contact with at least one sensor site, exciting the sensor site in order to obtain an emitted signal, and selectively collecting the emitted signal by means of at least one optical element and utilizing a supercritical angle fluorescence method. The optical elements, which can be formed by diffractive elements or other integrated (e.g. Fresnel lens type) structures facilitating the collection of light emitted to the desired angles, collect the emitted light with the highest intensity, i.e. at/above the critical angle of total internal reflection. The light emitted at smaller angles is blocked by non-transparent/absorbing films/coatings/blockers on/under the bottom of the waveguide and to the other direction by the appropriate blockers and structures, e.g. reflective surfaces or diffractive elements.

However, the known devices using TIRF and SAF for exciting fluorophores at a surface and collecting light from the fluorophores requires bulky set-ups which may also be complex to manufacture. In addition, it may be desirable to use disposable sample holders, and such disposable sample holders should preferably be simple and very cheap to manufacture. The sample plate disclosed in US 2016/0011112 A1 is complex and will not be cheap.

SUMMARY

An objective of the present inventive concept is thus to provide an improved apparatus for analysis of surface bound fluorophores. A particular objective of the present inventive concept is to provide an apparatus for analysis of surface bound fluorophores which allows making use of disposable and cheap sample holders.

These and other objects of the present inventive concept are at least partly met by the invention as defined in the independent claims. Preferred embodiments are set out in the dependent claims.

According to a first aspect, there is provided an apparatus for detecting fluorescent light emitted from a sample, said apparatus comprising: a light source, which is configured to emit excitation light of an excitation wavelength towards a sample comprising fluorophores such that fluorescent light is induced; a photo-detector for detecting light incident on the photo-detector; and an interference filter arranged on the photo-detector, wherein the interference filter is configured to selectively collect and transmit light towards the photo-detector based on an angle of incidence of the light towards the interference filter, wherein the interference filter is configured to selectively transmit supercritical angle fluorescence from the sample towards the photo-detector and suppress undercritical angle fluorescence from the sample.

The apparatus enables an interference filter to be used for selectively transmitting light towards the photo-detector in dependence of angle of incidence of light on the interference filter. Thus, the interference filter may be configured to pass supercritical angle fluorescent light, while suppressing undercritical angle fluorescence. This implies that light emitted by fluorophores close to a surface, e.g. a surface of a sample holder is selectively passed towards the photo-detector, which enables the apparatus to detect light from fluorophores close to the surface with a high signal-to-noise ratio. In particular, fluorescence from a bulk solution may be suppressed and, hence, not disturb detection of light from fluorophores close to the surface.

With the apparatus according to the first aspect, it is possible to provide excitation light through the bulk solution. As fluorescence from the bulk solution is suppressed, the supercritical angle fluorescent light may still be detected. Thus, the light source and the photo-detector may be arranged on separate sides of the sample, which implies that a simple set-up may be provided (e.g. no waveguides may be required).

Further, the use of an interference filter enables a compact and simple optical set-up for collection of light towards the photo-detector. In particular, no bulky optical components, such as lenses or mirrors for collecting the supercritical angle fluorescent light is necessary.

The interference filter being configured to selectively transmit supercritical angle fluorescence from the sample implies that the fluorescent sample is in contact or in close proximity (at a distance below a wavelength from a surface, e.g. <100 nm) to a substrate on which the interference filter is arranged.

Further, a top surface of the substrate or a bottom surface of a sample holder may be prepared with a refractive index matching medium to control refractive index of mediums that the supercritical angle fluorescent light is transmitted through. For instance, a viscous medium such as an oil, may be used as the refractive index matching medium. The supercritical angle fluorescent light produces an evanescent wave into the medium of the sample holder. The interface between the sample and the medium of the sample holder defines a critical angle corresponding to an angle at which light incident on the interface from the medium of the sample holder will be subject to total internal reflection (as a refractive index of the medium of the sample holder is larger than a refractive index of the sample). The supercritical angle fluorescent light propagates through the medium of the sample holder at an angle at or above the critical angle. The arrangement of a refractive index matching medium with higher refractive index than the medium of the sample holder allows the supercritical angle fluorescent light to be transmitted into the refractive index matching medium and ensures that the supercritical angle fluorescent light will not be subject to total internal reflection in the interface between the medium of the sample holder and the refractive index matching medium. Thus, an air interface to the sample holder should be avoided and, hence, using a refractive index matching medium may facilitate collection of the supercritical angle fluorescence.

As mentioned above, the sample holder may be prepared with a refractive index matching medium for providing a suitable interface to the substrate comprising the interference filter. This implies that the apparatus need not be pre-configured with a refractive index matching medium. As a further alternative, the apparatus may be prepared with a refractive index matching medium before use of the apparatus.

The interference filter may be arranged on the photo-detector by means of the interference filter being integral, e.g. monolithically integrated, with a substrate on which the photo-detector is formed. However, the interference filter and the photo-detector may be separately manufactured and the interference filter may be attached or connected to the photo-detector after manufacture of the separate components. In such case, a refractive index matching medium may also be arranged between the interference filter and the photo-detector in order to ensure that light transmitted through the interference filter reaches the photo-detector. The refractive index matching medium may ensure that supercritical angle fluorescence is only guided through layers with a refractive index that is larger than (or equal to) the refractive index of the layer the sample is in contact with in order to avoid total internal reflection in any interface that the supercritical angle fluorescent light passes.

According to an embodiment, the apparatus further comprises a receiver for receiving a sample holder, wherein the receiver is configured to define a relation between a sample in the sample holder and the interference filter. Sample holders may be disposable and may be manufactured separately from the apparatus. Hence, the apparatus may not be provided with a sample holder when sold. However, the apparatus may comprise a receiver for providing a well-defined position of a sample holder, such that a sample will be provided in a desired relation to the interference filter and the photo-detector when an analysis is to be made.

The receiver may comprise a movable carrier on which a sample holder may be placed. Thus, the receiver could, for instance, be arranged to move to a sample holder receiving position, wherein the receiver may partly extend outside a housing of the apparatus for receiving the sample holder. The receiver may further move to an analysis position, wherein the sample holder is arranged to present a sample for analysis inside the housing of the apparatus. This implies that the apparatus may comprise a closed housing during analysis, which may be advantageous for a secure use of the apparatus, in particular as a laser source may be used for providing the excitation light. Also, having a closed housing during analysis may prevent contamination of the sample during analysis such that reliable results may be obtained.

The sample holder may be prepared for providing a pre-processing of the sample before analysis of the sample in the apparatus. Thus, the sample holder may comprise substance(s) for reacting with a sample when the sample is introduced into the sample holder. The sample holder may thus be adapted to a specific type of analysis that may require a specific pre-processing of the sample.

A pre-processing of the sample may depend on the desired analysis to be made. Thus, the pre-processing of the sample may operate to expose molecules of interest from within a cell or to protect the molecules of interest from other molecules that seek to destroy the molecules of interest when the molecules of interest leave the protection of the cell. The pre-processing may involve mixing detector antibodies (tagged with fluorophores) with the molecules of interest before the detector antibodies are brought in contact with capture antibodies that are bound to the surface of the sample holder.

It should be realized that many other types of pre-processing of the sample may be performed in the sample holder and that the pre-processing of the sample may depend on the specific type of analysis to be made.

According to an alternative, the sample may be pre-processed before being introduced into the sample holder. This implies that the sample holder may merely provide a space for receiving a sample and presenting the sample for analysis, such that the sample holder may be very simple and, hence, inexpensive. However, it may be preferable to perform pre-processing of the sample in the sample holder, since this may also facilitate analyzing the sample during a reaction occurring in the sample holder such that the reaction may be followed in real-time. Further, pre-processing the sample before introducing the sample into the sample holder may cause a risk that external contaminants are introduced into the apparatus, so pre-processing of the sample outside the sample holder may need to be performed in a sterile manner.

According to an embodiment, the interference filter comprises a plurality of layers of at least two materials having different refractive indices for selectively transmitting light in dependence of wavelength of the light and angle of incidence of the light. The interference filter may selectively transmit light based on interference effects that occurs between incident and reflected waves in interfaces between the layers of the interference filters. The interference filter may thus selectively transmit light based on dependence of wavelength of the light and angle of incidence of the light. This implies that the interference filter may transmit supercritical angle fluorescence while suppressing undercritical angle fluorescence and also suppressing excitation light incident on the interference filter.

Since the interference filter may be configured to transmit light in dependence of both wavelength of light and angle of incidence of light, the interference filter may be configured to transmit supercritical angle fluorescence while suppressing undercritical angle fluorescence for a specific set-up of fluorescence wavelength and critical angle (given by the relation between refractive indices of the sample and the medium the sample holder). A specific set-up of fluorescence wavelength and angle of incidence of light may be used in several different types of analyses (e.g. using the same type of fluorophore), so the apparatus need not be limited to use for a single type of sample analysis.

Further, the interference filter of the apparatus may be configured to be exchangeable. Thus, the apparatus may be delivered together with a set of interference filters, each adapted for selectively transmitting supercritical angle fluorescence of a specific wavelength and angle of incidence. A user of the apparatus may then be able to change the interference filter such that an appropriate interference filter for the analysis to be made is always installed in the apparatus.

When the interference filter is to be exchangeable, the interference filter may preferably be a separate entity from the photo-detector and may be mounted in the apparatus separately from the photo-detector. The interference filter may thus be exchanged without a need to simultaneously exchange the photo-detector.

Different fluorescence wavelengths may also be associated with different excitation wavelengths. The apparatus may thus comprise a light source that may be controlled such that an appropriate excitation wavelength is emitted towards the sample or a set of parallel light sources configured to emit different wavelengths, such that the appropriate light source may be chosen depending on the desired excitation wavelength to be used.

According to an embodiment, the interference filter is integrally arranged on a substrate comprising the photo-detector. For instance, the interference filter may be monolithically integrated with the substrate. This implies that a fixed relationship with the photo-detector may be obtained, such that transmission of light from the interference filter to the photo-detector may be controlled by the fixed relationship. This implies that a well-defined set-up is provided, such that the apparatus is robust.

According to an embodiment, the apparatus further comprising a lens, which is arranged between the interference filter and the photo-detector, wherein the lens is configured to redirect light from the interference filter towards being incident parallel to a normal of a surface of the photo-detector. The lens may accurately control an origin of the supercritical fluorescence light that reaches the photo-detector. In particular, if an array of photo-sensitive areas is provided in the photo-detector, the detection of supercritical angle fluorescent light may be used for imaging the sample.

The lens may be connected to the layers of the interference filter, such that the lens and the interference filter may form a single stack of layers. Additionally or alternatively, a medium may be provided between the interference filter and the lens, and between the lens and the photo-detector, in order to avoid total internal reflection in interfaces of a light path (which may otherwise destroy a possibility of detecting the supercritical angle fluorescence.

According to an embodiment, the light source is configured to emit a collimated light beam for exciting fluorophores in a sample and wherein the apparatus is configured to receive a sample between the light source and the interference filter such that emitted light from the light source is transmitted through the sample before being collected by the interference filter.

This provides for a simple set-up as the light source and the interference filter may be arranged on different sides of a sample. There is no need to design the apparatus (e.g. with waveguides) for allowing the light source and the interference filter to be arranged on a common side of the sample. Further, thanks to the selective collection of supercritical angle fluorescence, the analysis of surface bound targets will not be affected by fluorescence in the bulk solution, such that illumination through the sample may be used even if fluorophores in the bulk solution have not settled to the surface. This implies that the illumination through the sample may be used for real-time analysis.

According to an embodiment, the apparatus further comprises a mask arranged on the interference filter, wherein the mask is configured to block transmission of light of the excitation wavelength. The mask may be arranged to block excitation light that passes unaffected through the sample, so as to ensure that the excitation light is not transmitted to the photo-detector. Since supercritical angle fluorescence is transmitted at an angle, the mask will not block the supercritical angle fluorescence.

According to an embodiment, a capping layer is arranged on the interference filter, the capping layer forming a surface for receiving a sample and defining a desired critical angle for light from a sample being arranged on the capping layer. Thus, a structure for receiving a sample may be integrated with the interference filter. Arranging a capping layer for receiving a sample on top of the interference filter may imply that there is no need for a refractive index matching medium between a sample holder and the interference filter. However, this may imply that the entire structure of the capping layer, the interference filter and the photo-detector may become disposable (or that rinsing may be needed between sequential analyses).

According to an embodiment, the light source comprises a waveguide having a total internal reflection surface for transporting light by total internal reflection in the waveguide, wherein the light source is configured for exciting fluorophores in a sample by evanescent light escaping the total internal reflection surface.

This implies that both excitation of fluorophores and collection of emitted fluorescent light may be selective to fluorophores arranged at or close to a surface of a sample holder. The selective excitation may thus further act to improve a signal-to-noise ratio of detected light for light emitted from fluorophores at or close to the surface.

According to an embodiment, the apparatus further comprises a lens for focusing excitation light towards a point in the sample. Thus, a confocal arrangement may be provided for selective excitation of fluorophores. A focusing of excitation light using a lens may have a smaller depth resolution compared to using evanescent light from total internal reflection. However, the use of a lens for focusing of excitation light may advantageously be used for selectively exciting fluorophores in a lateral position (in a plane of the surface on which the sample is arranged).

According to an embodiment, the apparatus further comprises a scanning element for scanning the focused light over the sample for imaging of the sample. Thus, the excitation light may be used for selecting a part of the sample that is to be excited, such that the detected light originates from only the selected part of the sample. This may be used for imaging of the sample while using a single photo-detector for detecting light, without the photo-detector providing any spatial resolution.

According to an embodiment, the photo-detector comprises an array of photo-sensitive areas, wherein each photo-sensitive area separately detects an amount of light incident on the photo-sensitive area. The array of photo-sensitive areas may be used for forming an image of the sample, as the different photo-sensitive areas of the photo-detector may receive light originating from different parts of the sample. It should be realized that the apparatus could be configured for imaging of a sample (having an array of photo-sensitive areas) or for quantitative analysis of an amount of supercritical fluorescent light from a sample (which would not require spatial resolution of the sample), wherein a single photo-sensitive area may be used.

According to a second aspect, there is provided a biosensor system, said biosensor system comprising: the apparatus according to the first aspect, and a sample holder for receiving a body fluid sample and for preprocessing the sample, the sample holder being configured to be arranged in the apparatus for allowing the apparatus to excite fluorescence in the body fluid sample and collect and detect supercritical angle fluorescence from the body fluid sample.

Effects and features of this second aspect are largely analogous to those described above in connection with the first aspect. Embodiments mentioned in relation to the first aspect are largely compatible with the second aspect.

The biosensor system may allow analyzing of a sample using a simple set-up which does not necessitate that targets bound to a surface are selectively illuminated with excitation light.

The sample holder may be configured for preprocessing the sample, such as including a substance that is arranged to react with the sample. The biosensor system may be configured for real-time analysis of the sample, e.g. while a process of the sample reacting with a substance of the sample holder is occurring.

The biosensor system could be used for detecting (bio) molecules so as to determine presence of molecules of interest in a sample. Similarly, the biosensor system may in other embodiments be used for detecting viruses. The biosensor system may in other embodiments be used for cell membrane imaging.

According to an embodiment, the biosensor system further comprises a processing unit, which is configured to receive information of detected light from the photo-detector and to determine a biological measurement based on the received information. Thus, the biosensor system may be configured to provide biological measurement results based on detected light by the photo-detector.

The processing unit may be remotely arranged from the apparatus. Thus, the apparatus may comprise a communication unit, e.g. for wired or wireless communication, for communicating information from the photo-detector to the processing unit. The processing unit may be provided on a computing unit connected to a network, such that the communication may take place via the network.

According to a third aspect, there is provided a detector for detecting supercritical angle fluorescent light, said detector comprising: a photo-detector for detecting light incident on the photo-detector; an interference filter arranged on the photo-detector, wherein the interference filter is configured to selectively collect and transmit light towards the photo-detector based on an angle of incidence of the light towards the interference filter; and a surface of the detector being treated in order to define a refractive index for collecting supercritical angle fluorescent light from a sample being arranged in a sample holder on the surface, such that the interference filter is configured to selectively transmit supercritical angle fluorescence from the sample towards the photo-detector and suppress undercritical angle fluorescence from the sample.

Effects and features of this third aspect are largely analogous to those described above in connection with the first and second aspects. Embodiments mentioned in relation to the first and second aspects are largely compatible with the third aspect.

The detector includes an interference filter which may be used for selectively transmitting light towards the photo-detector in dependence of angle of incidence of light on the interference filter. Thus, the interference filter may be configured to pass supercritical angle fluorescent light, while suppressing undercritical angle fluorescence. An upper surface of the detector, which may be a surface of the interference filter or another surface, e.g. a surface of a capping layer which may be arranged on the interference filter, may be treated such that evanescent light of the supercritical angle fluorescence may pass energy into a surface layer such that the supercritical angle fluorescence may be detected. The treatment of the upper surface of the detector may be e.g. by means of a layer of a refractive index matching medium with higher refractive index than a medium of a sample holder.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

An apparatus for detecting fluorescent light emitted from a sample is provided. The apparatus is configured to detect supercritical angle fluorescent light. Before embodiments of the apparatus will be described in detail, supercritical angle fluorescence will be briefly described.

Figure 1:
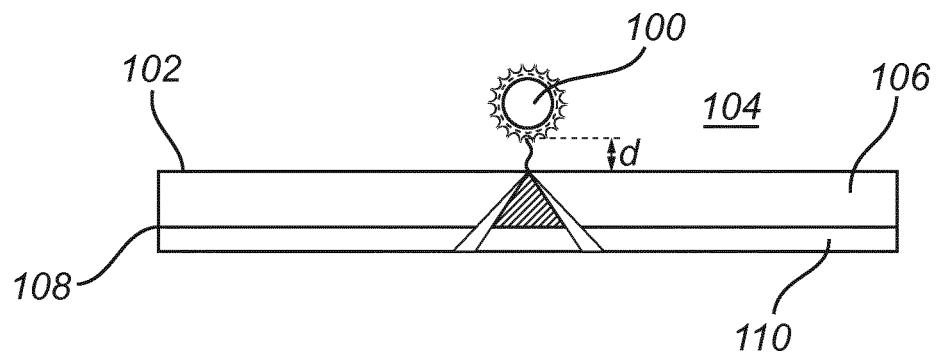
FIG. 1 is a schematic view illustrating supercritical angle fluorescence.

Referring now to FIG. 1, fluorophores 100 can be described by dipoles that preferentially emit fluorescent light in certain axes depending on an orientation of the dipole. In addition to this propagating component, fluorophores 100 emit an evanescent non-propagating component. This non-propagating component becomes propagating when the fluorophore 100 is at or below a distance of one wavelength from an interface 102. This is called supercritical angle fluorescence (SAF) and is emitted above a critical angle (corresponding to total internal reflection) of the interface between two materials at different sides of an interface. For example, if the fluorophore 100 is present in a solution of a sample arranged in a sample holder, the critical angle is defined by a relation of refractive index between the solution 104 (forming a first material on one side of the interface 102) and a material of the sample holder 106 (forming a second material on an opposite side of the interface 102). The material of the sample holder may typically be glass or plastic and may be selected in order to define a refractive index so as to select a critical angle formed in the interface 102.

The SAF may thus propagate into the material of the sample holder 106 and may be further transferred through a second interface 108 between the sample holder 106 and another medium 110, if the refractive index of the other medium 110 is the same or higher than a refractive index of the material of the sample holder 106, i.e. total internal reflection will be avoided in an interface of the sample holder 106 and the other medium 110. A surface of the sample holder 106 or a surface of a detector for collecting SAF may thus be treated with a refractive index matching medium 110 in order to ensure that the supercritical angle fluorescent light may be collected. For instance, the surface treatment may be provided by means of a viscous material, such as an oil, so that it may be ensured that there is no air gap between the sample holder 106 and the detector.

Figure 2:
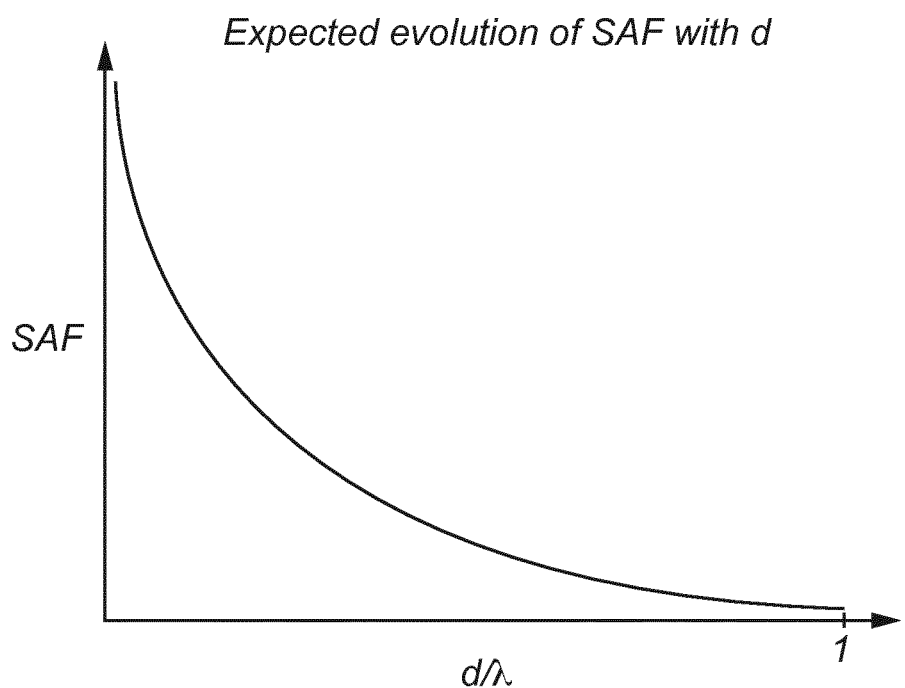
FIG. 2 is a chart illustrating intensity of supercritical angle fluorescence as a function of distance of a fluorophore from a surface.

The intensity of SAF can be as high as 50% of the total fluorescence emitted from a sample, if the fluorophores 100 are arranged close to a surface. As illustrated in FIG. 2, the intensity decreases with an almost exponential behavior with increasing distance (d) from the interface 102. Thus, if detection of light is selective to SAF and not disturbed by undercritical angle fluorescence, a very high sensitivity to fluorophores 100 arranged close to a surface is obtained.

Figure 3:
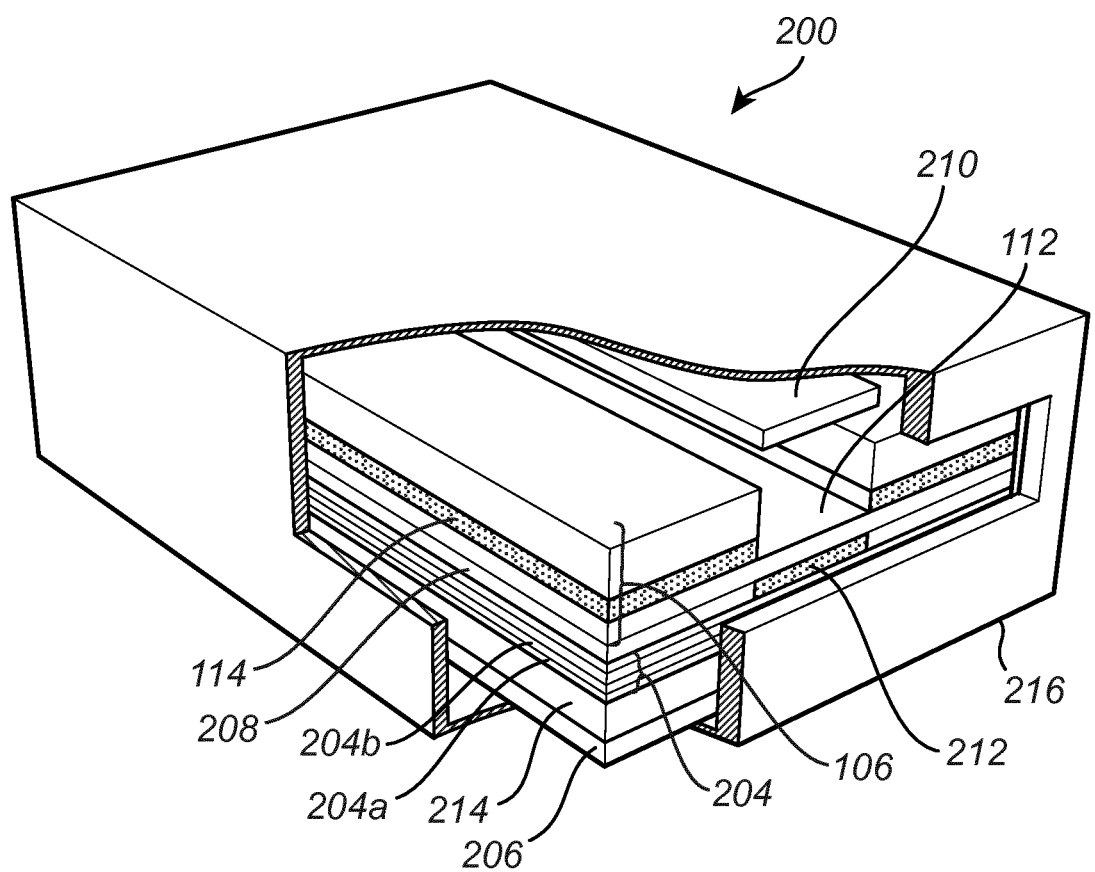
FIG. 3 is a schematic view of an apparatus according to a first embodiment.

Referring now to FIG. 3, an apparatus 200 for detecting fluorescent light emitted from a sample will be described.

The apparatus 200 comprises an interference filter 204. The interference filter 204 comprises a stack of layers for selectively transmitting light through the interference filter 204. The interference filter 204 may comprise a stack of alternating layers 204a, 204b of two different materials (having different refractive indices). In interfaces between layers in the interference filter 204, constructive interference may occur between light having traveled different path lengths through the interference filter 204 (different number of reflections in the interfaces between the layers). The refractive index and thickness of the layers 204a, 204b may thus control characteristics of light that will cause constructive interference. This implies that light that forms constructive interference in the interference filter 204 may be selectively transferred through the interference filter 204.

The interference filter 204 may be designed such that light having a specific angle of incidence will be selectively transmitted through the interference filter 204. Hence, the interference filter 204 may selectively transmit SAF light, while suppressing undercritical angle fluorescence. Thus, the interference filter 204 may be configured to filter out SAF allowing the SAF to be detected with a high signal-to-noise ratio.

Figure 4:
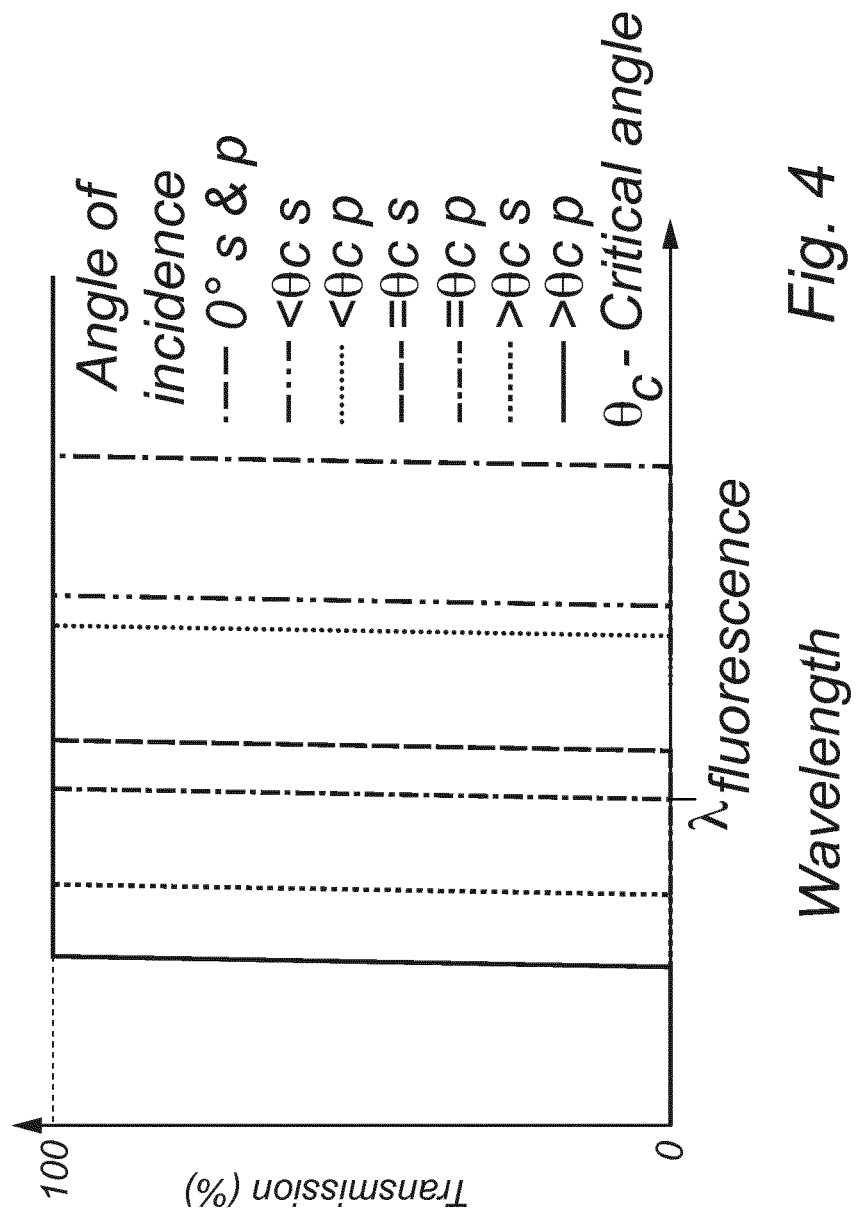
FIG. 4 is a chart illustrating transmission by an interference filter in dependence of an angle of incidence of light.

As indicated in FIG. 4, the interference filter 204 may be designed such that a cut-off wavelength is defined, which is dependent on an angle of incidence of light on the interference filter 204. The chart in FIG. 4 illustrates the transmission by the interference filter 204 for different angles of incidence of light. Light incident at the critical angle $\theta_c$ will thus be transmitted if the wavelength is equal to or larger than the fluorescence wavelength. Since the fluorescence wavelength is larger than the excitation wavelength, this also implies that excitation light will not be passed through the interference filter 204.

However, as also indicated in FIG. 4, there is a difference in cut-off wavelength for s-polarized and p-polarized light. Thus, the interference filter 204 may be designed such that a cut-off wavelength for s-polarized light incident at the critical angle corresponds to the fluorescence wavelength.

The apparatus 200 further comprises a photo-detector 206. The photo-detector 206 may be arranged to receive light having been transmitted by the interference filter 204.

The photo-detector 206 may comprise at least one photo-sensitive area, which is configured to generate a response, such as an electric charge, in proportion to light incident on the photo-sensitive area. Thus, the photo-detector 206 may generate a measurement of intensity of light being transmitted through the interference filter 204.

The photo-detector 206 may comprise a single or a few photo-sensitive areas, which may be configured to generally detect an intensity of SAF emitted by a sample. An output from the photo-detector 206 may then be used for quantitatively determining an amount of fluorophores 100 at a surface of the sample holder. However, the output may not necessarily determine an origin of the emitted light, such that the output may not be used for imaging of the sample. If a plurality of photo-sensitive areas is used, each may be configured to determine intensity of light emitted from a respective large region in the sample, such that the regions may be quantitatively compared.

In an alternative embodiment, the photo-detector 206 may comprise an array of photo-sensitive areas. The array of photo-sensitive areas may be used for imaging of the sample, as each photo-sensitive area in the array may receive SAF originating from a specific part of the sample.

The photo-detector 206 may for example be implemented as a charge-coupled device (CCD) or a complementary metal-oxide-semiconductor (CMOS) image sensor. Analog output from the photo-sensitive areas may pass an analog-to-digital converter, such that the photo-detector 206 may output a digital representation of detected light. The digital representation is then suited to be transferred to other entities for processing the detected SAF.

The interference filter 204 may be provided with a capping layer 208, which may protect the interference filter 204, e.g. against wear. The capping layer 208 may be formed on top of the interference filter 204. The apparatus 200 may be configured to receive a sample holder 106 such that the sample holder 106 is arranged on the capping layer 208. Alternatively, the sample holder 106 may be arranged directly on the interference filter 204.

An upper surface of the capping layer 208 or (if no capping layer is provided) an upper surface of the top layer in the interference filter 204 may be treated such that a contact between the sample holder 106 and the interference filter 204 is formed through a refractive index matching medium, such as an oil. Thus, it may be ensured that SAF propagating through a wall of the sample holder 106 will be propagated further into the interference filter 204.

The sample holder 106 may comprise walls, e.g. of glass or a plastic material, defining a cavity or space in which a fluidic sample may be provided. The sample holder 106 may thus function as a carrier for providing the sample in the apparatus 200.

The sample holder 106 may comprise one or more pre-defined measurement sites 112. The sample holder 106 may thus comprise a first mask 114 arranged on an inner surface of a wall of the sample holder 106. The first mask 114 may have holes or apertures, allowing the sample to be in contact with a wall of the sample holder 106 such that SAF may be generated. The holes or apertures in the first mask 114 may thus form measurement sites 112. The first mask 114 may also be formed from a material blocking transmission of fluorescent light (and excitation light) in order to further prevent light not originating from measurement sites 112 to reach the photo-detector 206.

The apparatus 200 may further comprise a light source 210, which is configured to emit excitation light towards a sample. As shown in FIG. 3, in a first embodiment, the light source 210 may be provided to emit light through the sample. Thus, the light source 210 and the interference filter 204 are provided on opposite sides of the sample.

This arrangement of the light source 210 may be convenient, as placement of the light source 210 does not interfere with placement of the interference filter 204 and photo-detector 206. Thus, a very simple set-up may be used.

Since light from the light source 210 is transmitted through the sample, fluorophores 100 in a bulk solution of the sample may be excited and emit fluorescent light. However, thanks to the interference filter 204 only selectively transmitting light having an angle of incidence equal with or larger than the critical angle, fluorescence from the bulk solution will not be transmitted through the interference filter 204 towards the photo-detector 206.

The light source 210 may be a laser providing light of a specific wavelength, which constitutes an excitation wavelength for enabling fluorescent light to be transmitted by the fluorophores 100.

The light source 210 may be associated with a lens or other optical component for focusing excitation light to a spot in the sample close to the inner surface of a wall of the sample holder 106. Thus, a confocal arrangement may be provided, wherein the fluorophores 100 close to the surface are selectively excited (and also SAF from these fluorophores is selectively detected over bulk fluorescence).

The confocal arrangement may be used for scanning over a lateral surface at the inner wall of the sample holder 106, such that different regions of the sample may be sequentially excited.

The capping layer 208 may comprise a second mask 212. Alternatively, a wall of the sample holder 106 may be provided with the second mask 212. The second mask 212 may selectively block transmission of the excitation wavelength, while transmitting the fluorescence wavelength. For instance, the second mask 212 may be configured to absorb or reflect light of the excitation wavelength. The second mask 212 may be configured to have an inverted pattern to the first mask 114. Alternatively, the second mask 212 may extend over an entire surface of the sample holder 206/interference filter 204.

Since the excitation light is transmitted by the light source 210 directly towards the interference filter 204, the second mask 212 may be needed to avoid light from the light source 210 to leak through the interference filter 204. The blocking of the excitation light may be important as an intensity of the light transmitted by the light source 210 may be much stronger than an intensity of the SAF.

The apparatus 200 may optionally further comprise a lens 214 between the interference filter 204 and the photo-detector 206. The lens 214 may direct light from the interference filter 204 towards being perpendicularly incident on the photo-sensitive area(s) of the photo-detector 206. Thus, the lens 214 may improve an intensity of light (number of photons) reaching the photo-detector 206 and also may improve the response to incident light (likelihood of an incident photon triggering a reaction in the photo-sensitive area).

The photo-detector 206 and the interference filter 204 may be formed as an integrated detector package, optionally with the lens 214 arranged there between.

The interference filter 204 may thus be formed directly on top a substrate comprising the photo-detector 206. This may be achieved by monolithically integrating the interference filter 204 on top of the photo-detector 206, such that the layers of the interference filter 204 are sequentially formed on the substrate comprising the photo-detector 206. Alternatively, the interference filter 204 may be separately manufactured before being integrated on top of the photo-detector 206.

According to an alternative embodiment, the photo-detector 206, the lens 214 and the interference filter 204 may be manufactured and arranged in the apparatus 200 as separate components. However, in such case, a refractive index matching medium needs to be provided between each of the components in order to prevent total internal reflections in any of the surfaces (which would otherwise severely affect detection of SAF).

Further, in an embodiment, the interference filter 204 may be configured to be exchangeable in the apparatus. The interference filter 204 may be adapted to selectively transmit SAF of a specific wavelength and incident on the interference filter 204 at a specific angle. Thus, by changing the interference filter 204, the apparatus 200 may be changed to work for a different wavelength of SAF and/or a different angle of incidence of the SAF on the interference filter 204.

Thus, the apparatus 200 may be delivered with a set of interference filters 204 such that the apparatus 200 may be selectively configured to work for a set of different wavelengths of SAF and/or different angles of incidence of the SAF on the interference filter 204.

As a different fluorescence wavelength often may require different excitation wavelengths, the apparatus 200 may further comprise a light source 210 that may be controlled such that an appropriate excitation wavelength is emitted towards the sample. Alternatively, the apparatus 200 may comprise a set of parallel light sources 210 configured to emit different wavelengths, such that the appropriate light source 210 may be chosen depending on the desired excitation wavelength to be used.

The apparatus 200 may comprise a housing 216, in which all components of the apparatus 200 are mounted. The housing 216 may provide a well-defined relationship between the light source 210 and the interference filter 204 and the photo-detector 206 so that a robust set-up for performing analyses on samples is provided.

The housing 216 may also enclose all the components, which may imply that laser light emitted by the light source 210 is confined to the housing 216. Thus, the apparatus 200 may be used safely and a user of the apparatus 200 need not be specially trained in use of laser equipment.

The apparatus 200 may further comprise a receiver for receiving a sample holder 106. The receiver may be movable to between a receiving position, in which the receiver may partially extend from the housing allowing the sample holder to be placed in the receiver, and an analysis position, in which the receiver may be arranged in the housing in order to place the sample holder 106 in a desired relation to the light source 210, the interference filter 204 and the photo-detector 206.

The receiver may alternatively provide guiding surface(s) for guiding insertion of the sample holder 106 (e.g. through a slot in the housing 216) so that a sample is properly presented in an analysis position in the housing 216.

It should be realized that components of the apparatus 200 may alternatively be separately manufactured and delivered. The apparatus 200 may thus be assembled when it is to be used. Thus, the light source 210, the interference filter 204 and the photo-detector 206 may each be separately manufactured.

As mentioned above, in a specific embodiment, the interference filter 204 and the photo-detector 206 may form an integrated detector, which may be manufactured and sold as a separate piece of equipment. For advanced users, the integrated detector may then be used as a part in a self-assembled set-up allowing the user to make choices of light source and optical components to be used in the set-up.

Figure 5:
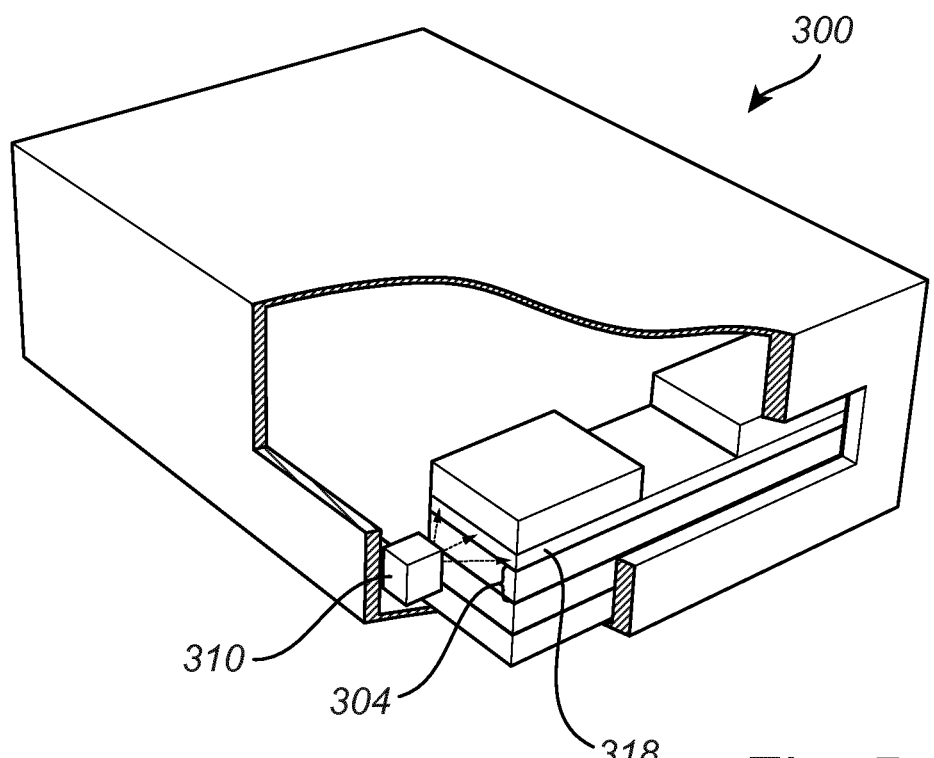
FIG. 5 is a schematic view of an apparatus according to a second embodiment.

Referring now to FIG. 5, a second embodiment of the apparatus 300 will be described. The discussion of features and components of the first embodiment apply to a large extent also to the second embodiment and the discussion will therefore not be repeated here for brevity. Rather, only the features that differ between the first and second embodiments will be discussed.

The apparatus 300 of the second embodiment uses an evanescent field for providing excitation of the fluorophores 100. Thus, the apparatus 300 defines a light path associated with the light source 310. The light path may provide a surface in which total internal reflection of the excitation light may occur. The sample is arranged close to the total internal reflection surface and an evanescent light field in the vicinity of the total internal reflection surface may thus reach the sample and excite fluorophores 100.

As shown in FIG. 5, the apparatus 300 may comprise a waveguide 318, such that light from a light source 310 may propagate through the waveguide 318 by means of total internal reflection. As shown in FIG. 4, the waveguide 318 may be arranged as a layer above the interference filter 304. Further, a sample holder 106 may be arranged above the waveguide 318 in order to allow the evanescent excitation light to affect the sample. Alternatively, the waveguide 318 may form part of sample holder 106, such that the waveguide 318 may present a surface on which the sample is directly provided.

Using evanescent light for excitation of fluorophores 100 implies that only fluorophores 100 close to a surface are excited. Further, the interference filter 304 ensures that only SAF is collected. This implies that the set-up of the second embodiment may provide a very good signal-to-noise ratio of detected light, as background noise may be very limited.

Figure 6:
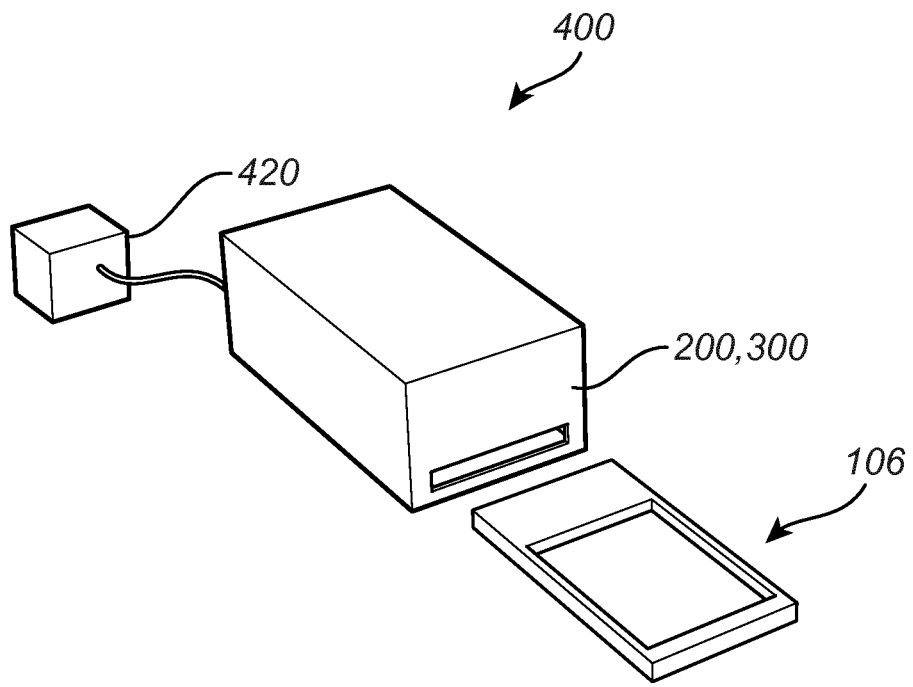
FIG. 6 is a schematic view of a biosensor system.

The apparatus 200, 300 discussed above may advantageously be used in a biosensor system 400, as shown in FIG. 6. The biosensor system 400 may comprise a sample holder 406 which may be specifically prepared for preprocessing a sample. The sample holder 406 may thus e.g. comprise a substance for reacting with a sample, such that the reaction may then be observed by the apparatus 200, 300. The sample holder 406 may also comprise fluorophores 100 which may selectively attach to targets in the sample for allowing the targets to be observed in the analysis performed by the apparatus.

A pre-processing of the sample in the sample holder 406 may depend on the desired analysis to be made. For instance, the pre-processing of the sample may operate to expose molecules of interest from within a cell or to protect the molecules of interest from other molecules that seek to destroy the molecules of interest when the molecules of interest leave the protection of the cell. The pre-processing may involve mixing detector antibodies (tagged with fluorophores) with the molecules of interest before the detector antibodies are brought in contact with capture antibodies that are bound to the surface of the sample holder.

It should be realized that many other types of pre-processing of the sample may be performed in the sample holder 406 and that the pre-processing of the sample may depend on the specific type of analysis to be made.

The biosensor system 400 may for instance be used for detecting (bio)molecules so as to determine presence of molecules of interest in a sample. Similarly, the biosensor system 400 may in other embodiments be used for detecting viruses in a sample. The biosensor system 400 may in yet other embodiments be used for cell membrane imaging.

The biosensor system 400 may comprise a processing unit 420, which may be arranged within the housing of the apparatus 200, 300. The processing unit 420 may thus be configured to receive information from the photo-detector 206, e.g. in the form of a digital representation of detected light, so as to allow making an analysis. The processing unit 420 may thus be configured to determine a biological measurement based on the received information.

The processing unit 420 may alternatively be remote from the apparatus 200, 300. The apparatus 200, 300 may thus comprise a communication unit for wired or wireless communication with the processing unit 420. The communication unit may communicate the digital representation of detected light, or may communicate a pre-processed representation.

The processing unit 420 may be any type of unit able to process information. The processing unit 420 may be a general-purpose processing unit, such as a central processing unit (CPU), which may be loaded with a computer program product in order to allow the processing unit 420 to perform the desired operations. The processing unit 420 may alternatively be a special-purpose circuitry for providing only specific logical operations. Thus, the processing unit 420 may be provided in the form of an application-specific integrated circuit (ASIC), an application-specific instruction-set processor (ASIP), a field-programmable gate array (FPGA), or a digital signal processor (DSP).

In the above the inventive concept has mainly been described with reference to a limited number of examples. However, as is readily appreciated by a person skilled in the art, other examples than the ones disclosed above are equally possible within the scope of the inventive concept, as defined by the appended claims.

For instance, a sample holder may be integrated with the interference filter and the photo-detector for providing a complete chip prepared for receiving a sample. The sample holder may be fused to the interference filter, such that refractive index matching medium is not needed between the interference filter and the sample holder. However, if the sample holder is only used once (to avoid need of rinsing the sample holder), it may be desired to have an inexpensive, disposable sample holder. For such applications, having a sample holder integrated with the interference filter and the photo-detector may be less advantageous.

The invention claimed is:

1. A biosensor system comprising:
an apparatus for detecting fluorescent light emitted from a sample, said apparatus comprising:
a light source, which is configured to emit excitation light of an excitation wavelength towards a sample comprising fluorophores such that fluorescent light is induced;
a photo-detector for detecting light incident on the photo-detector;
an interference filter arranged on the photo-detector,
wherein the interference filter is configured to selectively collect and transmit light towards the photo-detector based on an angle of incidence of the light towards the interference filter, wherein the interference filter is configured to selectively transmit supercritical angle fluorescence from the sample towards the photo-detector and suppress under critical angle fluorescence from the sample;
a sample holder for receiving and preprocessing a fluidic sample, the sample holder being configured to be arranged in the apparatus for allowing the apparatus to excite fluorescence in the fluidic sample and collect and detect supercritical angle fluorescence from the fluidic sample; and
a receiver for receiving the sample holder, wherein the receiver is configured to define a relation between the fluidic sample in the sample holder and the interference filter,
wherein the receiver is configured to arrange the sample holder in the apparatus such that supercritical angle fluorescence is only guided through layers with a refractive index that is equal to or larger than a refractive index of the sample holder.

2. The biosensor system according to claim 1, wherein the interference filter comprises a plurality of layers of at least two materials having different refractive indices for selectively transmitting light in dependence of wavelength of the light and angle of incidence of the light.

3. The biosensor system according to claim 1, wherein the interference filter is integrally arranged on a substrate comprising the photo-detector.

4. The biosensor system apparatus according to claim 1, further comprising a lens, which is arranged between the interference filter and the photo-detector, wherein the lens is configured to redirect light from the interference filter towards being incident parallel to a normal of a surface of the photo-detector.

5. The biosensor system according to claim 1, wherein the light source is configured to emit a collimated light beam for exciting fluorophores in the sample and wherein the apparatus is configured to receive the sample between the light source and the interference filter such that emitted light from the light source is transmitted through the sample before being collected by the interference filter.

6. The biosensor system according to claim 2, wherein the apparatus further comprises a mask arranged on the interference filter, wherein the mask is configured to block transmission of light of the excitation wavelength.

7. The biosensor system according to claim 1, wherein a capping layer is arranged on the interference filter, the capping layer forming a surface for receiving the sample and defining a desired critical angle for light from the sample being arranged on the capping layer.

8. The biosensor system according to claim 1, wherein the light source comprises a waveguide having a total internal reflection surface for transporting light by total internal reflection in the waveguide, wherein the light source is configured for exciting fluorophores in the sample by evanescent light escaping the total internal reflection surface.

9. The biosensor system according to claim 1, further comprising a lens for focusing excitation light towards a point in the sample.

10. The biosensor system according to claim 9, further comprises a scanning element for scanning the focused light over the sample for imaging of the sample.

11. The biosensor system apparatus according to claim 1, wherein the photo-detector comprises an array of photo-sensitive areas, wherein each photo-sensitive area separately detects an amount of light incident on the photo-sensitive area.

12. The biosensor system according to claim 1, further comprising a processing unit, which is configured to receive information of detected light from the photo-detector and to determine a biological measurement based on the received information.

13. An apparatus for detecting fluorescent light emitted from a sample, said apparatus comprising:
a light source, which is configured to emit excitation light of an excitation wavelength towards a sample comprising fluorophores such that fluorescent light is induced;
a photo-detector for detecting light incident on the photo-detector; and
an interference filter arranged on the photo-detector,
wherein the interference filter is configured to selectively collect and transmit light towards the photo-detector based on an angle of incidence of the light towards the interference filter, wherein the interference filter is configured to selectively transmit supercritical angle fluorescence from the sample towards the photo-detector and suppress undercritical angle fluorescence from the sample, and
wherein a capping layer is arranged on the interference filter, the capping layer forming a surface for receiving the sample and defining a desired critical angle for light from the sample being arranged on the capping layer.

* * * * *